United States Patent Office 3,449,557
Patented June 10, 1969

3,449,557

FUNCTION GENERATORS

William Spencer Percival, West Ealing, London, England, assignor to Electric & Musical Industries Limited, Hayes, Middlesex, England, a company of Great Britain Filed Jan. 16, 1964, Ser. No. 338,150
Claims priority, application Great Britain, Jan. 16, 1963, 1,926/63
Int. Cl. G06j *7/26;* G06f *15/34*
U.S. Cl. 235—197 15 Claims

ABSTRACT OF THE DISCLOSURE

This specification describes function generators for producing functions of two variables applied as electrical signals to a pair of Zener diodes. The signals are applied so that the Zener diodes operate between zero voltage and the Zener voltage, for which range a substantially exponential relationship between current and voltage is exhibited. The generators can be used to multiply or divide audio signals by control signals and they allow a wide range of control with a low breakthrough of the control signal when the circuit parameters are accurately balanced.

The present invention relates to function generators of the type utilising the variation in impedance with applied voltage or current of a non-linear device, such as, for example, a diode.

It is an object of the present invention to provide an improved function generator including two Zener diodes in which first and second input signals are applied to said diodes in push-push and push-pull respectively and an output signal is derived from said diodes in combination.

When a Zener diode is operated between zero voltage and its Zener voltage, the characteristics of the diode is substantially exponential over a very wide range of currents. Furthermore, the differential drift and differential temperature coefficient between pairs of Zener diodes are both small.

Consider the following expressions:

$$Y_1=e^{x_1};\ y_2=e^{x_2} \quad (1)$$

and $$2u=x_1-x_2;\ 2v=y_1-y_2;\ 2w=x_1+x_2;\ 2z=y_1+y_2 \quad (2)$$

Then it is easily shown that $$v=e^w \sinh u \quad (3)$$

$$z=e^w \cosh u \quad (4)$$

$$v=z \tanh u \quad (5)$$

$$w=\tfrac{1}{2} \log (z^2-v^2) \quad (6)$$

where the first two equations are derived by simple substitution and the last two follow immediately from the first two. We shall be concerned more particularly with Equations 3 and 5.

If $u$ is small, Equation 3 becomes $$v=e^{w}\cdot u \quad (7)$$

while Equation 5 becomes $$v=z\cdot u \quad (8)$$

In order to deal with the case when $u$ is not small let $$t=e^{w_o} \sinh u \quad (9)$$

when $$v=e^{w-w_o}\cdot t \quad (10)$$

Also let $$t'=s \tanh u \quad (11)$$

when $$v=zt'/s \quad (12)$$

Equations 7 and 8 represent approximate methods and Equations 10 and 12 exact method of obtaining the required functions.

Now consider two similar Zener diodes carrying different currents so that $$i_1/i'=e^{V_1/V'};\ i_2/i'=e^{V_2/V'} \quad (13)$$

corresponding to Equation 1 and, corresponding to Equation 2, $$v=\frac{i_1-i_2}{2i'} \quad (14)$$

$$u=\frac{V_1-V_2}{2V'} \quad (15)$$

$$w=\frac{V_1+V_2}{2V'} \quad (16)$$

$$z=\frac{i_1+i_2}{2i'} \quad (17)$$

Let $$\frac{i_1-i_2}{2}=i_s,\ \frac{V_1-V_2}{2}=S,\ \frac{V_1+V_2}{2}=G' \text{ and } \frac{i_1+i_2}{2}=G$$

Equation 3 then becomes $$i_s/i'=e^{G'/V'} \sinh S/V' \quad (18)$$

where S is half the difference of the voltage applied to the diodes, G′ is the mean voltage applied to the diodes and $i_s$ is the output current equal to half the difference of the currents in the diodes. In other words S can be considered as the push-pull voltage applied to the diodes, G′ as the push-push voltage and $i_s$ as the output current taken in push-pull.

If $S/V'$ is small, $$i_s/i'=e^{G'/V'}\cdot S/V' \quad (19)$$

in which S can be an audio signal of small amplitude, G′ a gain control voltage and $i_s$ the audio output signal. It will be seen that equal increments of G′ increase the level of the signal by equal amounts in dB.

Equation 5 becomes $$i_s=G \tanh S/V' \quad (20)$$

in which G is the mean current supplied to the diodes, i.e., the push-push current.

If $S/V'$ is small $$i_s=G\cdot S/V' \quad (21)$$

which gives the product GS.

If $i_s$ is replaced by an input signal $i_s'$ in the form of a current in push-pull and S is replaced by an output voltage S′ taken in push-pull we have $$S'/V'=i_s'/G \quad (22)$$

given an audio output signal equal to the quotient of a weak input signal by the gain control signal G.

In order to deal with the case when the audio, or controlled, signal is not small, it is necessary to employ two pairs of diodes connected in tandem. An audio signal $i_{so}$ is applied to the first pair together with a gain control voltage $G_o'$ giving an output voltage $$S_o/V'=\sinh^{-1} (i_{so}/i'\cdot e^{-G_o'/V'}) \quad (23)$$

corresponding to Equation 9. The output voltage S of this first stage is then applied as an input voltage to the second pair of diodes giving $$I_s/i'=e^{G'/V'} \sinh S_o/V' \quad (24)$$

Eliminating $S_o/V'$ we obtain the final output in terms of the original input and to two gain control signals $$i_s=e^{(G'-G_o')/V'}i_{so} \quad (25)$$

In practice either $G'$ or $G_o'$ can be constant.

For the tanh case when the audio signal is not small we have $$S_o/V'=\tanh^{-1} i_{so}/G_o \quad (26)$$

in which the input to the first pair of diodes is the push-pull current $i_{so}$ controlled by the push-push gain control current $G_o$, the output push-pull voltage $S_o$ being applied as input to the second pair of diodes giving $$i_s=G \tanh S_o/V' \quad (27)$$

Eliminating $S_o/V'$ we obtain the final output in terms of the original input audio signal and the two gain control signals $$i_s=i_{so}\cdot G/G_o \quad (28)$$

which gives exact multiplication and division. In practice $G_o$ would be kept constant if multiplication were required while, for division, G would be kept constant. It will be understood that references to the audio signal and to the control signal, while indicating the particular application with which we are now concerned, are primarily by way of illustration.

In order that the invention may be clearly understood and readily carried into effect it will now be described with reference to the accompanying drawings, of which:

Throughout the figures, a reference letter beside an arrow on a conductor indicates the magnitude of the current in the conductor, the arrow indicating the direction of flow of the current; a reference letter beside a circle indicates the voltage applied to or derivable from that point in the circuit. If an arrow is placed as a conductor only one end of which is connected to the circuit, the reference beside the arrow indicates the magnitude of the current applied or derivable from the circuit along that conductor, the arrow indicating the direction of the current. In the figures, the refernces $v$ and $z$ are used for the currents and $u$ and $w$ for the voltages which is equivalent to putting $i'$ and $V'$ of Equation 13 both equal to unity, thus facilitating reference to the simpler equation such as 3 and 5.

Figure 1:
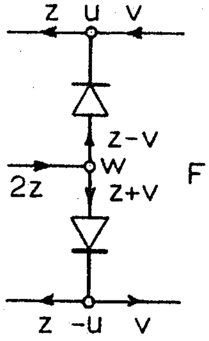
FIGURE 1 shows in diagrammatic form a simple example of the invention.
Figure 2:
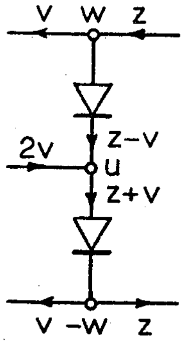
FIGURE 2 shows another example of the invention.

It is possible to arrange the diodes in a symmetrical manner either as in FIGURE 1 or as in FIGURE 2. It will be observed that, in both cases, the currents through the diodes are $z$ and $v$ and $z-v$ while the corresponding voltages across the diodes are $w+u$ and $w-u$. These relations constitute an essential feature of the invention whatever the actual configuration of the circuit.

Different functions can be obtained by choosing different variables as the two inputs and the output, subject to the obvious restrictions that $z$ and $w$ cannot be chosen independently nor can $v$ and $u$. This gives a total of 8 possible functions. It will be understood that a current input must be supplied through a high impedance and a voltage input from a low impedances, while a current output must be taken through a low impedance and a voltage output across a high impedance.

If the variables on the right of Equations 3 to 6 are taken as inputs, 4 functions can be produced while, if the left hand variable and the compatible variable on the right hand side are taken as inputs, the remaining 4 functions can be produced. These are:

$$u=\sinh^{-1} v.e.^{-w} \quad (29)$$

$$w=\log (z/\cosh u) \quad (30)$$

$$u=\tanh^{-1} v/z \quad (31)$$

$$z^2=v^2+e^{2w} \quad (32)$$

We are particularly concerned with Equations 3, 5, 29 and 31.

Figure 3:
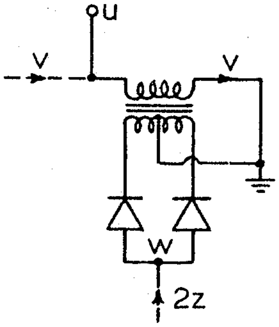
FIGURE 3 shows a further example of the invention.

FIGURE 3 shows a circuit for the case when $u$ and $v$ are A.C. signals. To obtain Equation 3 the input voltages are $u$ and $w$, the output being the current $v$ as shown between the primary of the transformer and earth. In practice $v$ would be taken as the voltage across a small resistance. To obtain Equation 5, the voltage input $w$ is replaced by the current input $2z$ as shown along the dotted line.

To obtain Equation 29, a voltage $w$ is applied together with a current $v$ along the dotted line, the output being taken as the voltage $u$. To obtain Equation 31 the voltage $w$ is replaced by the current $2z$.

Figure 4:
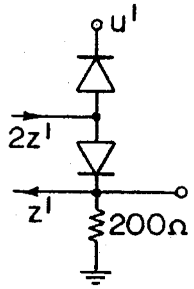
FIGURE 4 shows yet another example of the invention.

FIGURE 4 gives Equation 5. If now FIGURE 3 is used with inputs $v$ and $2z$ to give the output $u$ as in Equation 31 and the input $u'$ to FIGURE 4 is made equal to $u$, the final output $v'$ will be given by $$v'=vz'/z \quad (33)$$

corresponding to Equation 12.

All the functions described for FIGURE 3 have been produced and the output $u$ as above fed into a cathode follower giving the output $u'$ into a transformer feeding the circuit of FIGURE 4 with $z'$ as a constant D.C. current. In this way the audio signal $v$ was divided by the control signal $z$.

Note that $v'$ is taken as a voltage developed across the 200 ohm resistor.

It is now necessary to consider the effects of mismatching between the diodes forming a pair. In so far as the diodes are not matched, some of the control signal, e.g., $z$ in the divider as given by Equation 33 with $z'$ constant, will appear as an additive term in the output $v'$. If the control signal occupies a different, e.g. lower, frequency band than the input signal $v$, the breakthrough signal can be filtered out. However, in many cases, it is required that the spectra of the signals shall overlap so that the breakthrough signal cannot be filtered out. Thus, the control signal may have frequency components extending up to 2 kc./s., although not at full amplitude. In one example the tolerable breakthrough signal must be about 60 db below the peak signal level. Moreover, it is not practicable to select diodes which are matched to this degree of accuracy.

Figure 5:
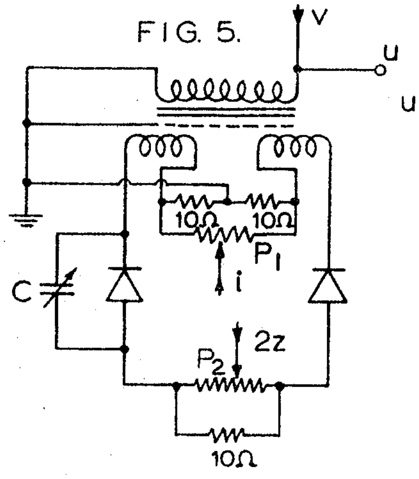
FIGURE 5 shows a modified form of the example of the invention shown in FIGURE 3.

It is therefore required to provide auxiliary means for balancing. It is, of course, not sufficient to balance at one value of the control signal, but the best approximation must be found over the whole range of variation of the control signal. FIGURE 5 shows the balancing means adopted for the circuit of FIGURE 3. The best single balancing means has been found to consist in varying the relative D.C. bias on the two diodes. If the diodes are originally matched so as to give a breakthrough signal 26 db below the peak signal, this bias may improve the balancing to, say, 40 db. A limit is set by the shunt capacitance of the diodes which may be as much as 500 pf. and may differ as between the two diodes by 100 pf. This can be corrected by a capacitor across one of the diodes when the balance may be improved to, say 46 db.

A further improvement can be obtained by varying the relative resistance in series with each diode whereby the breakthrough can be reduced to the order of 60 db over the range. In FIGURE 5 the relative bias is adjusted by the potentiometer $P_1$ and the D.C. current $i$ and the relative series resistance by the potentiometer $P_2$, the balancing capacitor being C. It will be understood that other balancing means can be employed to minimise the breakthrough signal over the range of variation of the control signal, the means adopted being, however, the best for the particular diodes tested. It has been found that, once the balance has been set, the subsequent drift and variation with temperature is extremely small, provided that the diodes are suitably chosen and are enclosed in a brass block or otherwise shielded so that both diodes are equally affected by variations in ambient temperature. A still further improvement can be obtained by enclosing the diodes in an oven controlled by a thermostat.

The transformer employed should have low losses and a sufficiently high inductance in order that its impedance as measured across the secondary winding in series with the diodes should be high compared with the highest impedance of the two diodes in series. For one purpose it was required to operate down to an audio frequency of about 700 c./s. while the highest impedance of the diodes in series was about 7,000 ohms so that the secondary inductance should be not less than 10 h. It was also found desirable to insert an earthed shield between the two windings.

If the diodes are not perfectly matched, even harmonics of the input signal $v$ will appear in the output. The method of balancing which has been adopted is, in effect, a method of matching the diodes and hence reduces even harmonics as well as reducing breakthrough. If the circuit of FIGURE 3 is not followed by that of FIGURE 4, odd harmonics are produced in accordance with Equation 31. These harmonics can be reduced to a negligible value by reducing the input signal amplitude. But this has the disadvantage that it increases the breakthrough ratio. Hence the peak signal input should be as large as possible, subject to the condition that the harmonic distortion is not too large. FIGURE 4 can be regarded as a device for reducing, ideally to zero, the odd harmonic distortion produced by the circuit of FIGURE 3. However, if the input to the circuit of FIGURE 4 is too small, the odd harmonic distortion will be undercompensated while, if the input is too great the distortion will be overcompensated. It has therefore, been found advantageous to adjust the level of the input to the circuit of FIGURE 4 to give zero third harmonic distortion.

Unbalance between the diodes of FIGURE 4 does not produce breakthrough of the control signal, but can give even harmonic distortion. Hence it may be desirable to balance this circuit also. Nevertheless, accurate balancing is less important than for the circuit of FIGURE 3.

An upper limit to the frequency response is set by the capacitance of the diodes and of the transformer. The latter should, therefore, be kept as low as possible. It is also desirable to keep the leakage between the two parts of the secondary as low as possible for the same reason and to prevent reactive unbalance. Bifilar windings have been employed for the secondary.

It will be understood that the circuits of FIGURES 3 and 4, are given only as particular examples. The essential features of the invention are the currents through the diodes and/or the voltages across the diodes expressed as functions of the input signals and the output signal.

The invention has certain practical advantages as compared with multiplying and dividing by taking logs and antilogs in the ordinary way with the aid of exponential diodes. It will be understood that it is not possible to take the log of the unmodified audio signal, since the voltage passes through zero. It is therefore necessary to add a steady voltage to the signal (or to adopt some equivalent method) when the output of the device is the product of the audio signal plus the steady voltage and the control signal. But the product of the steady voltage and the control signal represents breakthrough. Hence it is necessary to add some of the control signal in opposition in the output.

If the three diodes employed for logging and antilogging were all perfectly exponential, this balancing process would be possible, but would be somewhat more complicated than the automatic balancing which would be obtained with perfect diodes in the circuit according to the invention. Moreover, the summing of the outputs from the loggers would also be slightly more complicated. Again, it is, according to the invention, sufficient to employ only one pair of diodes with a low audio signal input, instead of three as required for logging.

If, however, the diodes were not truly exponential, the process of balancing out the breakthrough signal would be much more troublesome with the logging method, owing to the lack of symmetry, than with the symmetrical circuitry according to the invention.

The invention may be used for the control of audio signals for compression or expansion or may be used in analogue computers for function generation, multiplication or division.

Figure 6:
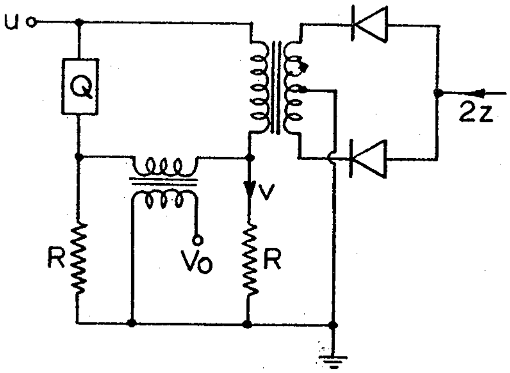
FIGURE 6 shows a further modification of FIGURE 3.

A limitation to the linearity of multiplication and division obtainable by the circuits of FIGURE 3 and FIGURE 5 is set by the finite impedance of the transformer. In the case of the multiplier this can be overcome by the addition of the bridge circuit as shown in FIGURE 6 to the circuit of FIGURE 3 in which $u$ is the input voltage $2z$ the input current and $v$ the output current, while Q is an impedance equal to the impedance of the transformer to the inuput signal $u$ in parallel with the capacitances of the diodes in series referred to the primary of the transformer. In practice, it has been found sufficient to make Q a resistance in parallel with a capacitance.

The operation of the circuit can be seen most clearly by noting that, in the absence of the additional bridge, circuit, a potential will be developed across the output resistance R even if the diodes are backed off so as to pass no steady current, whereas, in an ideal multiplier, the output should be zero under these circumstances. The error can be reduced by increasing the impedance of the transformer, but it has been found that a limit is set by the resistance of the transformer windings, which causes other errors, and by the shunt capacitance of the transformer and the diodes. On the other hand, the output signal $V_0$ derived from the additional bridge circuit, when correctly balanced, is zero when the diodes are sufficiently backed off.

The balancing arrangements for the diodes are not shown in FIGURE 6 but should be the same as for the divider shown in FIGURE 5.

In the case of the divider there is a corresponding error, in that, if the diodes are sufficiently backed off, the output should be infinite. Clearly this cannot be corrected with the aid of an additional bridge circuit, but may be corrected over a limited range, by negative feedback across the transformer primary, producing a shunt impedance equal and opposite to the impedance due to the transformer and diode capacitances. The principle is well known to those skilled in network theory.

It will be understood that, both for the divider and for the multiplier, if used to control an audio signal it is desirable to employ an optimum level of audio signal since, if the level is too high, the harmonic distortion will be too great while, if the signal level is too low, the ratio of the breakthrough of the control voltage to the audio signal will be intolerably high. This difficulty may be resolved by the use of a divider circuit with fixed control voltage to correct the multiplier, and a multiplier with fixed cotnrol voltage to correct the divider. Nevertheless, useful economies can be effected if the audio signal level is sufficiently low to make it possible to dispense with the correction circuits.

In one example of the invention it has been found that a 1 volt D.A.P. audio signal can be applied to the diodes when a corrector circuit is used and a signal of about 0.25 volt D.A.P. when no correction is employed.

The main objections to the use of a 1 volt signal together with corrector circuits are:

(a) The need to balance the diodes of the corrector circuits to prevent second harmonic distortion.

(b) The need to adjust the input levels into the corrector circuits rather accurately to obtain accurate cancellation of the third harmonic.

(c) The attenuation associated with the correction by the divider circuit. This is due to the fact that a current output is required; which, in practice, means that a voltage must be developed across a relatively small resistance.

The objections (a) and (b) can be overcome by using a smaller audio voltage, say, 0.5 volt D.A.P. The objection (c) can be overcome by a corrector circuit based on Equation 29. The divider is then described by the equation $$u=\tanh^{-1} v/z$$

and the corrector by the equation $$u'=\sinh^{-1}(v'e^{-W'})$$

Now put $e^{-W'}=k$, since W′ is constant, and $v'k=Au$, where A is a constant, so that the output of the corrector is given by $$u'=\sinh^{-1}[A \tanh^{-1} v/z]$$

Neglecting powers of $v/z$ greater than $(v/z)^3$ we have $$u'=\frac{Av}{z}+\frac{A}{3}\frac{v^3}{z^3}-\frac{A^3}{6}\frac{v^3}{z^3}$$

or, putting $A=\sqrt{2},$ we have $u'=Av/z=\sqrt{2},\ v/z$.

Since $u'$ is a voltage output from the corrector and $kv'$ is a current input, the output voltage from the corrector can be of the order of 0.5 volt. On the other hand, the tanh type of corrector requires an input voltage of about 0.5 volt, but the output voltage is developed across a relatively low resistance and must therefore be much less than 0.5 volt, e.g., 20 mv.

According to an alternative method the low resistance referred to above is constituted not by a physical resistance but by the input resistance of a following amplifier using negative feedback whereby the reduction of signal-to-noise ratio and signal-to-drift ratio otherwise associated with the low resistance is avoided.

Figure 7:
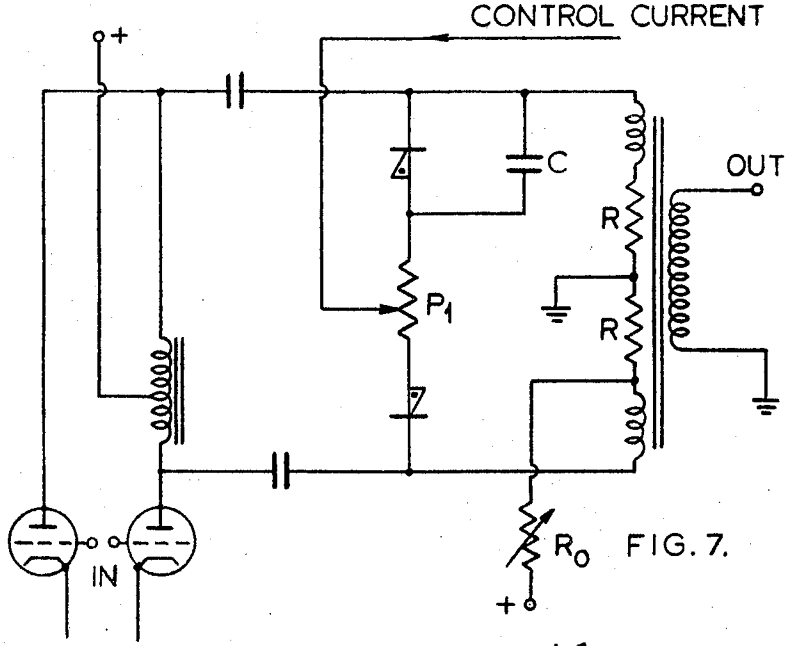
FIGURE 7 is a diagram of one example of a divider according to the invention.
Figure 8:
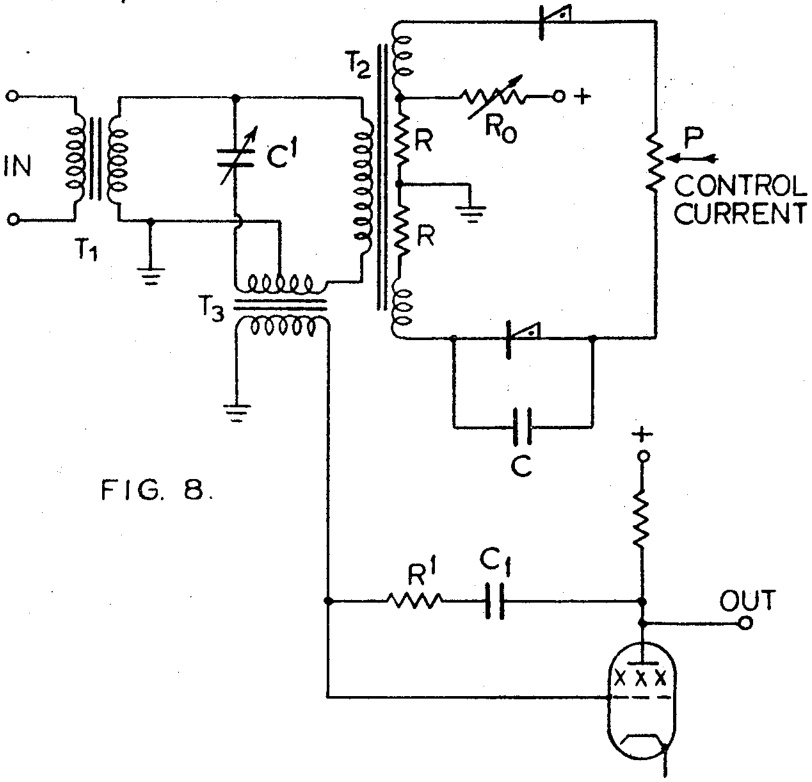
FIGURE 8 is a diagram of one example of a multiplier according to the invention.

FIGURES 7 and 8 show practical circuit arrangements for a divider and a multiplier respectively for dividing and multiplying an audio signal by quantities represented by control currents.

In the divider shown in FIGURE 7, the input audio voltage is set up across two Zener diodes in series, and the slope resistances of the diodes are inversely proportional to the control current with the result that the audio current flowing in the primary windings of the transformer is inversely proportional to the magnitude of the control current. Thus the output signal developed in the secondary winding of the transformer is proportional to the input signal applied in push-pull across the diodes divided by the magnitude of the control current applied to the wiper of the potentiometer $P_1$ and therefore applied in push-push to the two diodes.

In the multiplier shown in FIGURE 8 the impedances of the Zener diodes appear across the primary of the transformer $T_2$ thus attenuating the signal transfer from the secondary winding of the transformer $T_1$ to the primary winding of the transformer $T_3$. The condenser C′ is adjusted to provide zero coupling at high frequency for zero control current applied to the diodes. As in the divider shown in FIGURE 7 the diode impedances are inversely proportional to the magnitude of the control current applied to them in push-push, but in this case they appear in series with the signal, so that the net result is a multiplication of the input signal by the control current.

In the divider shown in FIGURE 7 the resistive balance of the diodes is adjusted by adjustment of the wiper of the potentiometer $P_1$, the voltage balance by the adjustment of the variable resistance $R_0$, and the capacitive balance by the provision of the condenser C connected in parallel with one of the diodes. In the multiplier shown in FIGURE 8, the potentiometer P provides the resistive balance, resistance $R_0$ the voltage balance and the condenser C the capacitive balance. In both figures the capacitive balance condenser C may be adjustable.

Although the invention has been described with reference to specific examples it is to be understood that it is in no way limited to these examples and many other arrangements using the invention will be evident to those skilled in the art.

What I claim is:

1. A continuously variable function generator comprising a transformer having primary and secondary windings, two Zener diodes connected in series with like electrodes adjacent across the secondary winding of said transformer, means for applying a current representing a first quantity to said adjacent like electrodes so that said current is divided equally between said diodes, means for applying an input signal representing a second quantity as a current to the primary winding of said transformer, both said quantities being such that said diodes operate between zero voltage and the Zener voltage for which range a substantially exponential relationship between current and voltage is exhibited, and means for deriving an output signal as a voltage from said primary winding, whereby said output signal represents the product of said first and second quantities.

2. A continuously variable function generator comprising a transformer having primary and secondary windings, two Zener diodes connected in series with like electrodes adjacent across the secondary winding of said transformer, each of said diodes having for the range of electrical signals applied to it an exponential relationship between the current through it and the voltage across it, means for applying a current representing a first quantity to said adjacent like electrodes so that said current is divided equally between said diodes, means for applying an input signal representing a second quantity as a voltage to the primary winding of said transformer, both said quantities being such that said diodes operate between zero voltage and the Zener voltage for which range a substantially exponential relationship between current and voltage is exhibited and means for deriving an output signal as a current from said primary winding, whereby said output signal represents the quotient of said second quantity divided by said first quantity.

3. A function generator for generating a function of two variables comprising first and second Zener diodes to which input signals respectively representing the two variables are applied and from which an output signal representing the function is derived, means for applying a first input electrical signal represening a first of the variables with the same polarity to both the devices, means for applying the second input electrical signal representing the second of the variables to the first device with one polarity and to the second device with the opposite polarity, both input signals being such that the diodes operate between zero voltage and the Zener voltage for which range a substantially exponential relationship between current and voltage is exhibited, wherein the output signal is derived by means responsive to a further electrical signal produced in response to one of the input signals acting on the resistance formed by the two devices taken together, the further electrical signal being in the form of that one of current and voltage which is different from the one input signal, the resistance of each device having a value dependent on both input signals.

4. A generator according to claim 3 wherein one of said input signals is an audio signal, and the other is an amplitude control signal.

5. A generator according to claim 3 wherein said diodes are connected in series with like electrodes connected together.

6. A generator according to claim 3 wherein said first input signal is a current which is applied to the common point of said diodes and is divided equally between the diodes, said second input signal is a voltage applied across said diodes in series, and said output signal is the current through said diodes in series, the arrangement being such that said output signal substantially represents the product of the quantities represented by said input signals for small values of said second input signal.

7. A generator according to claim 3 wherein said diodes are connected in series with unlike electrodes connected together.

8. A generator according to claim 7 wherein said first input signal is a current through said diodes in series, said second input signal is a voltage applied to the common point of said diodes and said output signal is a current derived from said common point and divided equally between said diodes, the arrangement being such that said output signal substantially represents the product of the quantities represented by said input signals for small values of said second input signal.

9. A generator according to claim 3 comprising a condenser connected in parallel with one of said diodes thereby to balance the capacities of said diodes.

10. A generator according to claim 3 comprising means for balancing the currents through said diodes.

11. A generator according to claim 3 comprising means for balancing the voltages applied to said diodes.

12. A function generator for generating a function of two variables comprising first and second Zener diodes to which input signals respectively representing the two variables are applied and from which an output signal representing the function is derived, means for applying a first input electrical signal representing a first of the variables with the same polarity to both of the diodes, means for applying the second input electrical signal representing the second of the variables to the first diode with one polarity and to the second diode of the opposite polarity, both input signals being such that the diodes operate between zero voltage and the Zener voltage for which range a subtsantially exponential relationship between current and voltage is exhibited, wherein the first input electrical signal is a voltage and means is provided for deriving the output signal in response to the current passing through the diodes in the same sense, the resistance of each diode having a value dependent on both input signals.

13. A function generator for generating a function of two variables comprising first and second Zener diodes to which input signals respectively representing the two variables are applied and from which an output signal representing the function is derived, means for applying a first input electrical signal representing a first of the variables with the same polarity to both of the diodes, means for applying the second input electrical signal representing the second of the variables to the first diode with one polarity and to the second diode of the opposite polarity, both input signals being such that the diodes operate between zero voltage and the Zener voltage for which range a substantially exponential relationship between current and voltage is exhibited, wherein the first input electrical signal is a current and there is provided means for deriving the output signal in response to the sum of the voltages produced across said diodes, the resistance of each diode having a value dependent on both input signals.

14. A function generator for generating a function of two variables comprising first and second Zener diodes to which input signals respectively representing the two variables are applied and from which an output signal representing the function is derived, means for applying a first input electrical signal representing a first of the variables with the same polarity to both of the diodes, means for applying the second input electrical signal representing the second of the variables to the first diode with one polarity and to the second diode of the opposite polarity, both input signals being such that the diodes operate between zero voltage and the Zener voltage for which range a substantially exponential relationship between current and voltage is exhibited, wherein the second input electrical signal is a voltage and there is provided means for deriving the output signal in response to the difference between the curernts flowing through the diodes, the resistance of each diode having a value dependent on both input signals.

15. A function generator for generating a function of two variables comprising first and second Zener diodes to which input signals respectively representing the two variables are applied and from which an output signal representing the function is derived, means for applying a first input electrical signal representing a first of the variables with the same polarity to both of the diodes, means for applying the second input electrical signal representing the second of the variables to the first diode with one polarity and to the second diode of the opposite polarity, both input signals being such that the diodes operate between zero voltage and the Zener voltage for which range a substantially exponential relationship between current and voltage is exhibited, wherein the second input electrical signal is a current and there is provided means for deriving the output signal in response to the difference between the voltage across the diodes, the resistance of each diode having a value dependent on both input signals.

References Cited

UNITED STATES PATENTS

| | | | |
|---|---|---|---|
| 2,714,702 | 8/1955 | Shockley | 323—66 |
| 3,206,619 | 9/1965 | Linn | 307—88.5 |
| 3,247,366 | 4/1966 | Tiemann | 328—160 X |
| 2,817,057 | 12/1957 | Hollmann | 323—87 X |

MALCOLM A. MORRISON, *Primary Examiner.*

ROBERT W. WEIG, *Assistant Examiner.*

U.S. Cl X.R.

235—194